United States Patent

Fontes et al.

[11] Patent Number: 6,114,989
[45] Date of Patent: Sep. 5, 2000

[54] GPS DATA RECORDER AND PLAYBACK SYSTEM

[75] Inventors: Joseph Fontes, Sunnyvale; John O'Boyle, III, Redwood City; Sven Dietrich, San Jose; Aaron Vincent Morton, Sunnyvale, all of Calif.

[73] Assignee: Trimble Navigation Limited, Sunnyvale, Calif.

[21] Appl. No.: 09/128,736

[22] Filed: Aug. 4, 1998

[51] Int. Cl.[7] .............................. G01S 5/02; H04B 7/185
[52] U.S. Cl. ....................................................... 342/357.06
[58] Field of Search .............................. 342/357.06, 165, 342/173; 702/122, 117, 108

[56] References Cited

U.S. PATENT DOCUMENTS 5,663,734    9/1997    Krasner ........................... 342/357.12

*Primary Examiner*—Thomas H. Tarcza
*Assistant Examiner*—Fred Mull
*Attorney, Agent, or Firm*—Blakely, Sokoloff, Taylor & Zafman LLP

[57] ABSTRACT

A circuit for storing GPS data gathered in the field is described. The stored data is later used to test the ability of GPS processing circuits to handle GPS data containing multipath interference and dropouts.

28 Claims, 4 Drawing Sheets

GPS DATA RECORDER AND PLAYBACK SYSTEM

FIELD OF THE INVENTION

The present invention relates to capturing and recording global positioning system (GPS) test data for use in testing GPS processing circuits.

BACKGROUND OF THE INVENTION

The Global Positioning System (GPS) is a multi-satellite based radio positioning system. The GPS system consists of a number of orbiting satellites positioned in a "constellation" such that at least four satellites are observable by a user almost anywhere on the earth's surface. Each satellite transmits signals on two radio frequencies known as L1 (1,575.42 Megahertz) and L2 (1,227.6 Megahertz) using spread spectrum techniques and employing two types of spread functions. The L1 frequency range carries C/A and Pseudo random noise (PRN) codes and the L2 frequency range carries P codes. Both P and C/A codes contain data that enables a receiver to determine the distance between a broadcasting satellite and an antenna receiving the radio signals. Both the P and C/A codes include navigation (nav) messages. These nav messages include (1) GPS system times, (2) handover words used in connection with transitions from C/A codes to P code tracking, and (3) FVMS ephemeris data (timing data) for the particular satellite being tracked and the almanac data for all satellites in the constellation. Thus in summary, the nav messages contain satellite positioning data as well as data on clock timing, the so-called "ephemeris" data. An antenna receives the satellite signal and a GPS receiving unit converts the satellite signal into digital data. A GPS processing circuit processes the digitized ephemeris data for a multiplicity of satellites to compute the location of the antenna receiving the ephemeris data.

GPS processing circuits typically perform two principle functions: (1), the circuit computes pseudo ranges to the various GPS satellites and (2), the circuit computes the position of the antenna receiving the GPS signals using the pseudo ranges, the satellite timing and ephemeris data. Pseudo ranges are merely time delays measured between the received signal from each satellite and a local clock. Satellite ephemeris and timing data is extracted from the GPS signal over a period of time, the period of time typically ranges from 30 seconds to several minutes. In order to compute the satellite ephemeris data and timing data, a reasonably good signal level is required in order to achieve low error rates.

When designing a GPS processing circuit, test data is needed to test the circuit. Simulators have been used to produce RF signals containing test data. The RF signals go through a RF section and then to the GPS processing circuit. Simulators generate test data based on mathematical models. Models can simulate real world data, but this data is inherently oversimplified. One problem is that simulated data typically does not include all of the artifacts that are present in "Real World" data. For example, simulated data typically does not contain many of the low signal levels, dropouts, and multipath interferences encountered in the actual use of GPS processing circuits. Dropouts occur when a moving antenna passes underneath a bridge, etc., or a signal from the satellite is blocked by foilage. Multipath interference occurs when signals are reflected off buildings, etc. Simulating such a variety of factors is impractical. Thus, simulator data testing alone is insufficient. After simulation testing, the GPS processing circuit is typically taken on a "road test" wherein the GPS processing circuit is coupled to a GPS receiving unit and antenna. The entire system is then tested as a mobile unit transports the receiving unit, antenna and processing circuit along a predetermined route to obtain "real world" data which is not restricted by the inaccuracies of any mathematical model.

"Road testing" a GPS system to determine the performance of a GPS processing circuit has several disadvantages. A first disadvantage is that road tests are time consuming and thus expensive. A second disadvantage is that the test is not repeatable. Even when the mobile unit takes the same route, the satellite constellation producing the GPS signal will have changed. Furthermore, weather conditions, traffic conditions, satellite constellation blockage, and switching due to skyscrapers, large buildings and structures, which might occur during a "road test" affect the quality of the GPS radio signal that is received. These variables make it almost impossible to receive exactly the same signals on different road tests making it difficult to compare the performance of a first GPS processing circuit tested in a first road test with a second GPS processing circuit tested on a subsequent road test. The non-repeatability of the road tests require that the tests be repeated many times over an extended time period to average out the variables.

Thus an improved method of generating GPS test data and testing GPS processing circuits is needed.

BRIEF SUMMARY OF THE INVENTION

A method and apparatus for generating and recording "real world" test data and using the recorded "real world" test data to test GPS positioning equipment is disclosed. In one embodiment, an antenna receives a GPS signal. A connected GPS receiver converts the received GPS signal into binary or digital GPS data. An interface board connected to the receiver translates the digital GPS data into a byte format for storage on a long-term storage device, such as a hard disk drive or magnetic tape. In an alternative embodiment of the invention, the digital GPS data received from the GPS receiver is recorded directly onto a long-term storage device.

After the data has been recorded, the long-term storage device may be disconnected from the receiving apparatus and coupled to GPS processing circuitry. The GPS processing circuitry analyzes the GPS data to determine the position of the antenna at the time the GPS signal was received. The recorded GPS data contains artifacts including dropouts, multipath interference and other difficulties encountered in the field, the testing, therefore, simulates a "road test". The simulated road test can be repeated on different GPS processing circuits using identical GPS data making possible a direct comparison of competing GPS processing circuit designs.

DETAILED DESCRIPTION OF THE INVENTION

Described herein is an apparatus and method for generating GPS test data and using the GPS test data to test a GPS processing circuit which are exemplary embodiments of the present invention. A mobile antenna is coupled to RF circuitry and taken on road tests in a mobile unit. The antenna receives RF GPS signals which the RF circuitry converts into binary form. A long term storage device coupled to the RF circuitry records the binary form GPS data. After the gathering of GPS data, the long-term storage device may be coupled to a GPS processing circuit. The GPS processing circuit utilizes the stored GPS data to determine the location of the GPS antenna at the time the GPS data was recorded.

Figure 1:
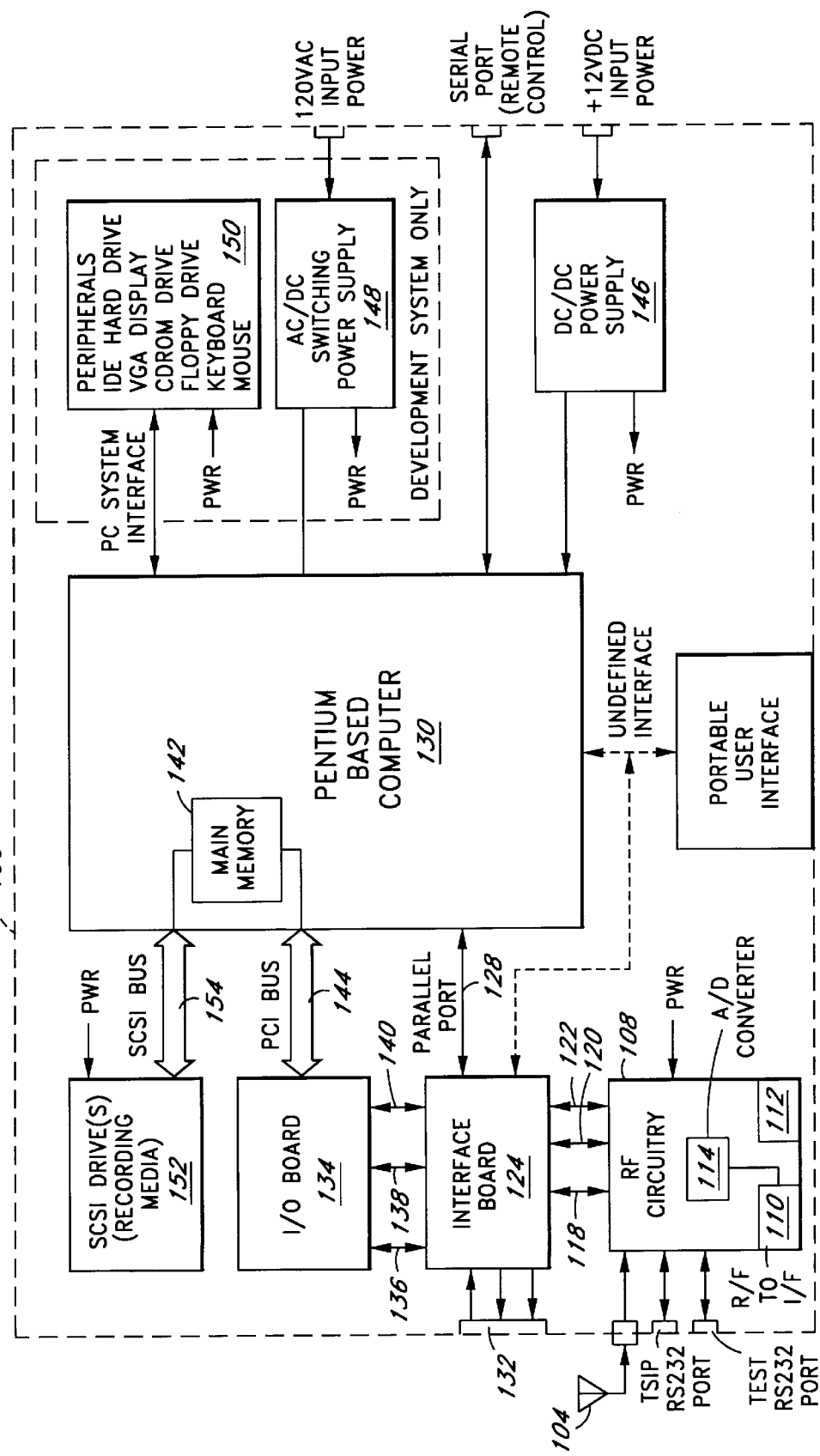
FIG. 1 is a block diagram of the major components of a system for collecting GPS test data, as implemented in one embodiment of the present invention.

FIG. 1 illustrates one embodiment of a data collecting apparatus 100 for collecting GPS test data. A GPS antenna 104 is coupled to the RF circuitry 108 of the data collecting apparatus 100. The RF circuitry 108 includes a radio frequency to intermediate frequency (RF to IF) converter 110 which converts the GPS signal received by GPS antenna 104 to a lower intermediate frequency (IF). A frequency synthesizer 112 provides a local oscillator or clock signal to the RF to IF converter 110. The intermediate frequency output by RF to IF converter 110 is transmitted to an analog to digital (A/D) converter 114 which converts the IF signal into GPS data in digital form. In the illustrated embodiment, the RF circuitry 108 outputs the digital GPS data as I and Q data streams generated by A/D converter 114. The I data and Q data, respectively, represents the in-phase and quadrature components of the GPS signal needed for acquisition and tracking of a biphase modulated signal.

RF circuitry 108 outputs a clock signal from frequency synthesizer 112 along clock line 118, I data on I signal line 120 and Q data on Q signal line 122. Typically, the frequency synthesizer 112 outputs a clock signal of around three Megahertz on clock signal line 118. One example of a RF circuit suitable for use as RF circuit 108 is the Scott RF chip produced by Trimble Navigation, Inc., of Sunnyvale, Calif.

In one embodiment of the invention, a long-term storage device directly records the output of the RF circuitry 108. One example of a long-term storage device capable of directly recording the I and Q data streams is a digital DCRS tape recorder from Ampex Corporation of Redwood City, Cal. However, long-term storage devices which can handle the data flow directly from the RF circuitry 108 are expensive. Furthermore, most recording media which can handle the high data rate output by RF circuit 108 are magnetic tape devices. Magnetic tape does not provide rapid random access to different portions of the data. Thus, in other embodiments of the invention, the digital GPS data output of RF circuit 108 is further processed to allow storage on other types of long-term storage devices.

Thus, in the embodiment of the invention shown in FIG. 1, the output of the RF circuitry 108 is transferred to an interface board 124 along clock line 118, I data line 120 and Q data line 122. The clock line 118 provides a reference clock from the frequency synthesizer 112 of the RF circuit 108. The I data line 120 and the Q data line 122 transfers digital or digital GPS data to the interface board 124. The interface board 124 buffers the data and organizes the digital GPS data to form bytes of GPS data or "GPS data bytes." In the illustrated embodiment, a computer 130, such as a Pentium-based personal computer or other general-purpose or dedicated processing unit, controls the interface board 124 through a parallel (or other communication) port connection 128. Interface board 124 also includes an external reproduce port 132 which outputs I and Q data to a GPS processing circuit (not shown). A more detailed schematic of the interface board 124 will be given in FIG. 2.

An input/output (I/O board) 134 is coupled to the interface board 124 through a reproduce control line 136, a data line 138 and a record control line 140. Interface Board 124 transfers GPS data in a byte format ("GPS data bytes") to the I/O board 134 where the GPS data bytes are input into computer 130. An example of a commercially available I/O board suitable for these purposes is National Instrument's PCIDIO-32HS board from National Instruments, Inc.

A memory 142 in the personal computer 130 receives GPS data from the I/O board through a bus 144 such as a PCI bus. The memory 142 of computer 130 temporarily stores the GPS byte data. Memory 142 is typically a volatile memory such as a random access memory (RAM) which requires that the computer 130 continue to receive power from a power supply such as a DC power supply 146 or an AC to DC power supply 148 in order to maintain the memory contents. In a typical portable computer, the AC to DC power supply 148 is used when a source of AC power is available. DC power supply 146 is used when either a 12 Volt DC power supply is available or a battery coupled to the laptop computer is being used. Computer 130 may also be coupled to peripherals 150 which may include floppy drives, keyboards, video monitors, CD-ROM drives, and other storage and communications peripheral devices.

A long-term storage device 152 for storing large amounts of data is coupled to the computer 130 through a bus such as a small computer system interface (SCSI) bus 154. The SCSI bus 154 transfers data between the long-term storage device 152 and the main memory 142 of the computer 130. It is preferred, although not required, that the long-term storage device 152 have the following characteristics: (1) the memory of the long-term storage device is non-volatile, meaning that it will retain the information stored even when power is not supplied; (2) the long-term storage device should have a large memory capacity; typically exceeding 1 gigabyte (3) the long-term storage device should be capable of fairly high data transfer rates, e.g., on the order of one megabyte per second or more. Examples of recording devices which satisfy these characteristics include, but are not limited to, a magnetic hard disk drives, optical disk drives and tape recording media. Suitable hard disk drives are commercially available from Seagate Technology and Quantum.

Figure 2:
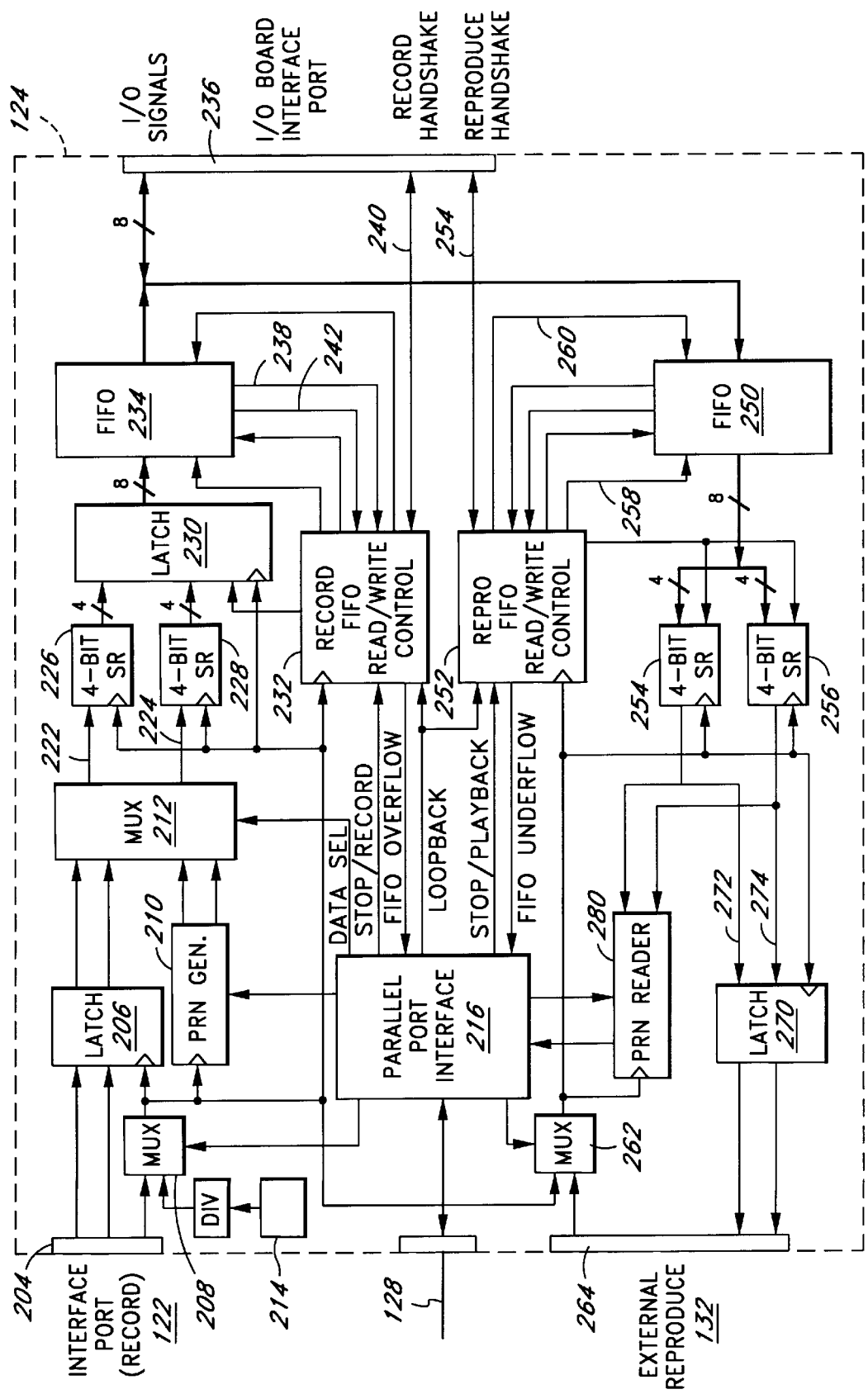
FIG. 2 is a block diagram of an interface board which receives data from a GPS receiving unit and converts the data into a form suitable for computer storage, as implemented in one embodiment of the present invention.

FIG. 2 illustrates one embodiment of an interface board 124. During normal operation, digitized GPS data such as I data and Q data is received from I data line 120 and Q data line 122 of FIG. 1 at interface port 204 where the digital GPS data is latched by latch 206. A clock signal also arrives through interface port 204. As data is received, multiplexer 208 selects the received clock signal for output and distribution throughout the interface board 124. Normal operation is defined as a state when the interface board 124 is transferring data from the RF circuit 108 to the I/O board 134. The clock signal selected and output by a multiplexer 208 is used to time the output of latch 206 and a pseudo random number generator (PRN Gen) 210.

Besides normal mode, the interface board 124 includes circuitry for running a test mode, to test operation of the interface board 124 as well as to test other circuitry in the data collection apparatus 100. Whether the circuit 124 is operating in a test mode or in a normal mode is determined by the control signals transmitted from the computer 130 of FIG. 1 to the parallel port interface 216. The parallel port interface 216 includes circuitry which receives the control signals from the computer 130 to control the starting and stopping of recording. The output of parallel port interface 216 is coupled to a select line of multiplexer 212 causing multiplexer 212 to output stored data from latch 206 in a normal mode and pseudo random number data from PRN Gen 210 in a test mode. Control signals from the parallel port interface 216 are also coupled to the select input of multiplexer 208 such that multiplexer 208 outputs the clock signal from the RF circuit on clock line 118 during normal operation. Multiplexer 208 outputs a local clock signal from a local oscillator 214 when in a test mode.

During normal operation, multiplexer 212 outputs GPS data for processing by the interface board 124 circuitry on channel one line 222 and channel two line 224. In test mode, multiplexer 212 selects and outputs data generated by the PRN Gen 210. Remaining interface board 124 circuitry operates very similarly in both test mode and normal mode except for minor variations including that during the test mode, a different clock will be used and the I and Q data will be replaced with pseudo random number data. Thus, for clarity, the remainder of the discussion will describe the circuit operation in normal mode.

In the illustrated embodiment, the I data is transferred along channel one line 222 to a shift register 226 and the second latched bit of data is transferred along channel two line 224 to a second shift register 228. Thus, each shift register 226, 228 accumulates I and Q data respectively until both shift registers 226, 288 are full. In the illustrated example, shift registers 226 and 228 are four bit shift registers. When the shift registers 226, 228 are both full, the eight bits stored in the two four bit shift registers 226, 228 are transferred into a second latch 230 to form eight bits or one GPS data byte of information. Thus, each GPS data byte of information output by latch 230 typically contains four bits of I data and four bits of Q data. In the illustrated embodiment, the first four bits of data (bits 7, 6, 5 and 4, as viewed left to right) of a GPS data byte will contain the output of channel one which is four bits of I data during the four consecutive clock cycles. The remaining four bits of a GPS data byte (bits 3, 2, 1 and 0) will contain the output of channel two which is Q data during the same four consecutive clock cycles. It is understood that other sequences of storing I and Q data in a GPS data byte are possible although in most embodiments, a GPS data byte will include four bits of I data and four bits of Q data.

A buffer FIFO 234 temporarily stores the GPS data bytes output by latch 230. In one embodiment, buffer FIFO 234 is a 32K by 8 buffer FIFO. A Record FIFO Read/Write Control ("RFRWC") 232 controls the flow of data by providing a latch enable signal to latch 230 and a read or write signal to buffer FIFO 234. When RFRWC 232 outputs a read signal to buffer FIFO 234, buffer FIFO 234 outputs a GPS data byte to the input/output board interface port 236.

A handshaking signal transmitted along line 240 from the computer 130 of FIG. 1 and a FIFO full signal transmitted along FIFO full line 238 indicates to the RFRWC 232 when to transfer data. When FIFO full line 238 or FIFO empty line 242 indicates that the buffer FIFO 234 is either full or empty, RFRWC 232 transmits a signal to latch 230 to stop the flow of data. The RFRWC 232 can also stop the flow of data through I/O interface port 236 using handshake line 240.

Thus, the data path from interface port 204, through latches 206, 230 and buffer FIFOs 234 converts the I and Q data (GPS data) to GPS byte data for output to I/O board interface port 236. The GPS byte data can be stored by commercially available storage devices. However, the original GPS data in I and Q data format still needs to be retrieved for use by GPS processing circuits. Thus, in "playback" mode the data path from I/O board interface port 236 to external reproduce port 264 converts the stored GPS data bytes back to GPS data in I and Q format.

In playback mode, the circuitry of interface board 124 receives GPS data bytes from long-term storage device 152 of FIG. 1 and outputs GPS data in a form usable by a GPS processing circuit. Thus, interface board 124 receives the recorded GPS data bytes through I/O board interface port 236 and outputs GPS data signals in a form usable by a GPS processing circuit, e.g., an I and Q format in the illustrated embodiment. A GPS processing circuit (not shown) receives the I and Q data from external reproduces port 132.

In the illustrated embodiment, computer 130 of FIG. 1 transfers GPS byte data from the long-term storage device 152 to a reproduce buffer FIFO 250 of interface board 124. Reproduce FIFO read/write control ("Rep. FRWC") 252 receives handshake signals along reproduce handshake line 254 from a controlling device, typically the computer 130 of FIG. 1. The Rep. FRWC 252 also receives signals from the reproduce buffer 250 indicating whether the reproduce buffer 250 is full or empty. In response, Rep. FRWC 252 controls the flow of data to prevent overflow or underflow of the reproduce buffer FIFO 250. Rep. FRWC 252 transmits control signals to shift registers 254 and 256, as well as read and write signals to reproduce buffer FIFO 250 along read line 258 and write line 260. When a clock signal and the read line 258 are asserted, reproduce buffer FIFO 250 outputs a GPS data byte to a first four-bit shift register 254 and a second four-bit shift register 256. In the illustrated embodiment, the first four-bit shift register 254 contains the portion of each GPS data byte corresponding to the I data and shift register 256 contains the portion of each GPS data byte corresponding to the Q data.

Multiplexer 262 selects between two possible clock signals, including (1) a clock signal from the GPS processing circuitry received from external reproduce port 132 and (2) a local clock from oscillator 214. The local clock signal is selected only when the interface board 124 circuitry is being tested. In normal playback, the multiplexer 262 outputs a clock signal from the GPS processing circuitry. The clock signal from the GPS processing circuit clocks the Rep. FRWC 252, the four-bit shift registers 254, 256 and reproduce latch 270. The reproduce latch 270 receives I bits from four-bit shift register 254 along line 272 and Q bits from shift register 256 along line 274. The reproduce latch 270 outputs the GPS data in an I data stream and a Q data stream to a GPS processing circuit through the external reproduce port 132.

When the interface board 124 is being tested in a test mode, the output of the four-bit shift register 254 and four-bit shift register 256 is routed to a pseudo-random number reader 280 (PRN reader). The PRN reader 280 receives the contents of the four-bit shift registers 254, 256. The data is forwarded to the parallel port interface 216 which compares the PRN reader data with data originally generated by the PRN Gen 210. When interface circuitry 124 is properly operating, the test data read by PRN reader 280 should match the test data originally generated by PRN Gen 210.

Figure 3:
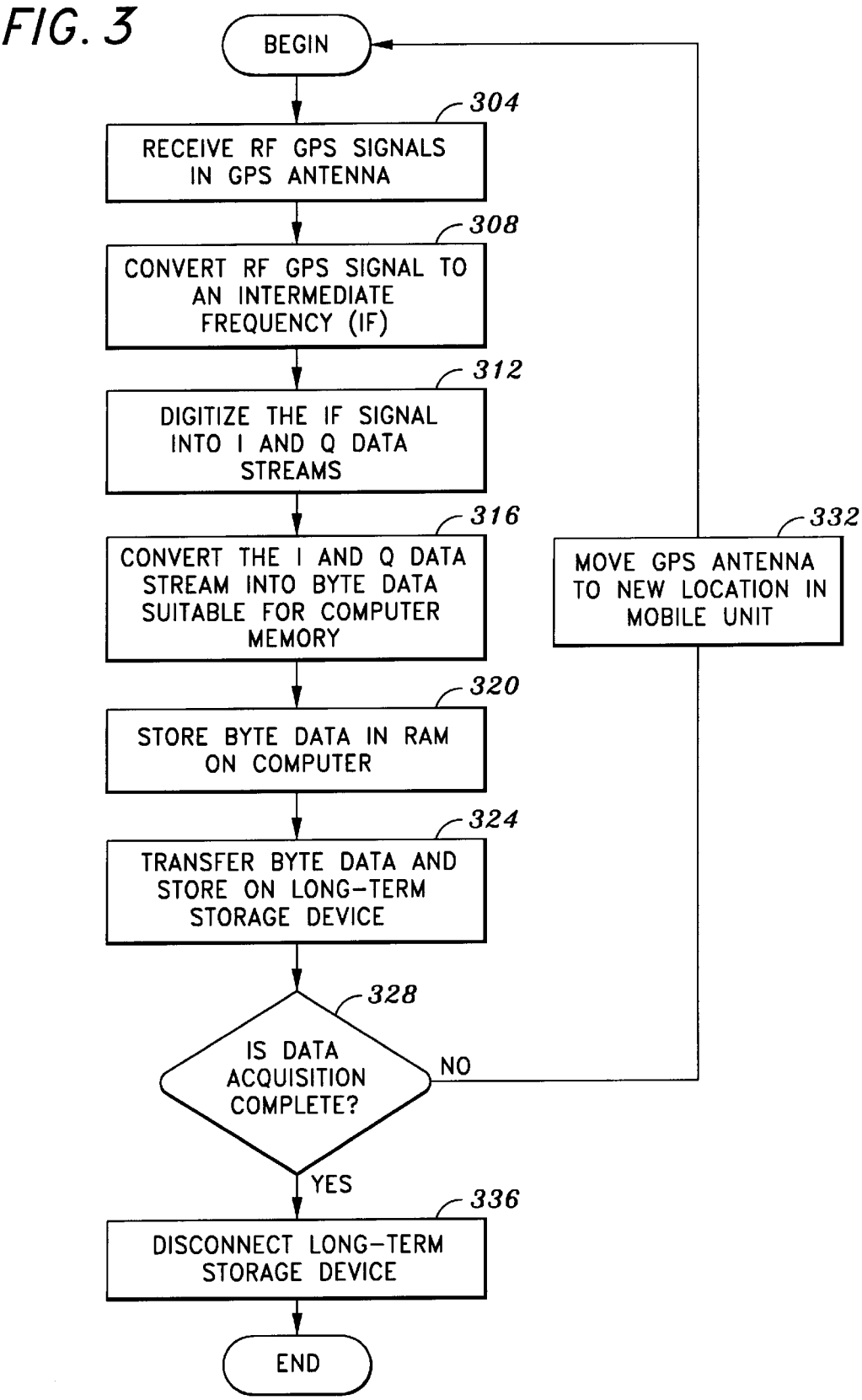
FIG. 3 is a flow diagram illustrating the recording of GPS test data, as implemented in one embodiment of the present invention.

FIG. 3 is a flow diagram of one embodiment of the present invention illustrating the steps used to obtain the GPS test data. In block 304, a GPS antenna receives a radio frequency GPS signal. The RF circuitry including the RF to IF converter receives and converts the radio frequency GPS signal to an intermediate frequency (IF) signal in block 308. In block 312, an analog to digital converter digitizes the IF signal into digital GPS data. In one embodiment, the digital GPS data includes an I data stream and a Q data stream.

The I and Q data streams are transferred to a circuit appropriate for handling the I and Q data streams. In one embodiment of the invention, a long-term storage device or magnetic media directly records the I and Q data streams. However, magnetic devices for storing I and Q data streams into GPS byte data suitable for computer processing and storage are expensive. Thus, in an alternate embodiment, block 316 is executed which converts the I and Q data stream into GPS data byte suitable for storage on computer storage devices.

In block 320, a random access memory (RAM) stores the GPS byte data. The RAM data is typically mounted inside a personal computer, although the RAM buffer may also be located in the long-term storage device, an I/O board or the interface board. The RAM acts as a buffer. From the RAM, the GPS byte data is transferred and stored on a long-term storage device in block 324. The long-term storage device is typically a hard-disk drive.

In decision block 328, the user determines whether data acquisition has been completed. Whether data acquisition is complete typically depends on whether a predetermined route for moving the GPS antenna has been finished. Examples of typical predetermined routes include a car driving along a route or a user moving over a field, etc. Thus, whether the data acquisition is complete may be determined by a switch, such as an on/off switch on the data acquisition apparatus. If data acquisition is not complete, the system continues to anticipate and record movement of the GPS antenna to the new location in block 332. The GPS antenna receives a new set of RF GPS signals at the new location repeating blocks 304 through 324. When, in decision block 328 it is determined that gathering of GPS data has been completed, the user may disconnect the long-term storage device from the RF circuitry receiving the GPS signal in block 336. Power to the long-term storage device may also be discontinued. At completion of the sequence in FIG. 3, a long-term storage device will, typically, contain from several minutes to several hours of GPS byte data.

Figure 4:
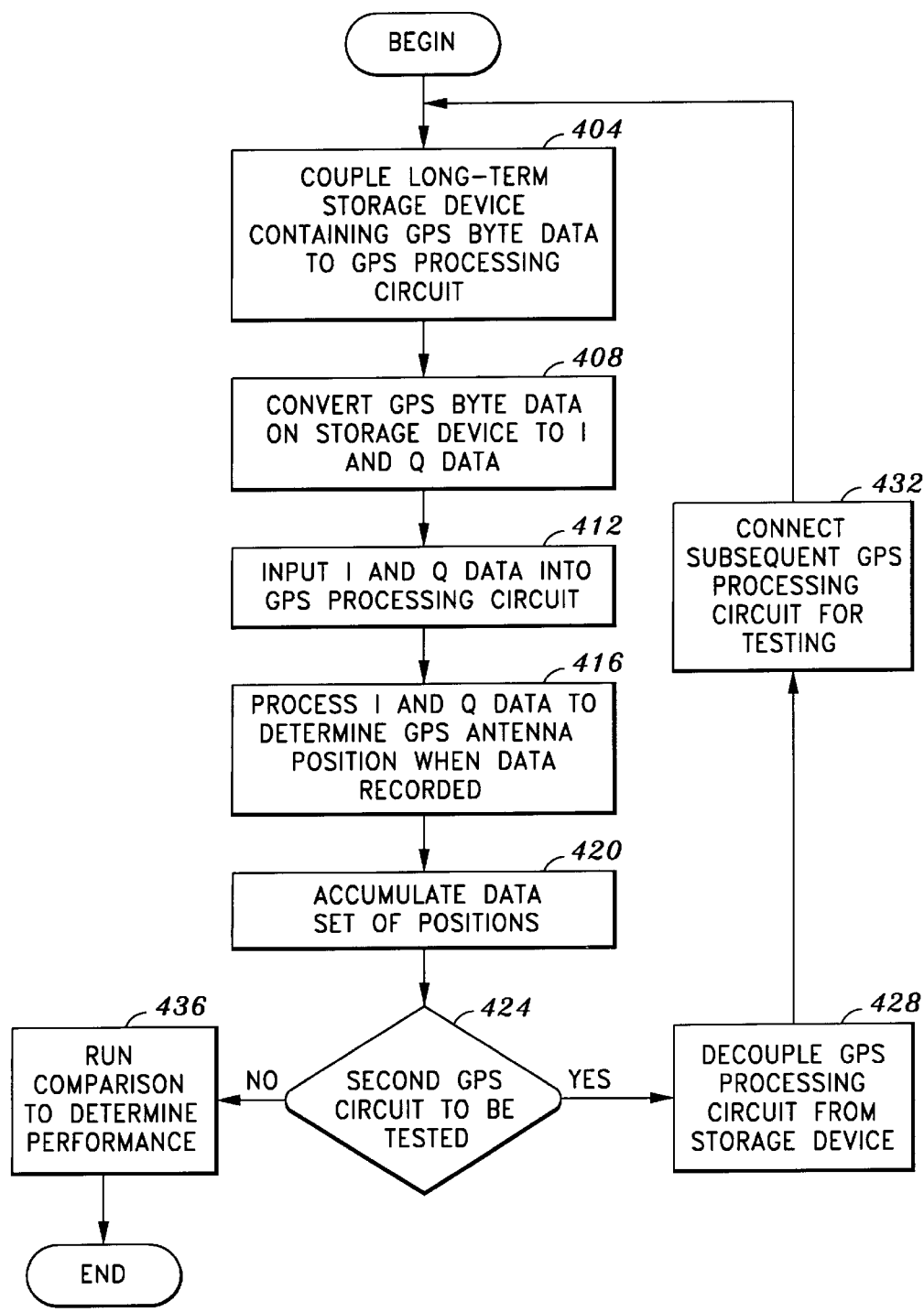
FIG. 4 is a flow diagram illustrating the use of recorded GPS test data to test a GPS processing circuit, as implemented in one embodiment of the present invention.

FIG. 4 is a flow diagram illustrating the use of GPS byte data to test a GPS processing circuit. In block 404 the long-term storage device containing the GPS byte data is coupled to a GPS processing circuit. In block 408 the GPS byte data is converted to GPS data suitable for use by a GPS processing circuit. In the illustrated embodiment, GPS data is I and Q data. The conversion is performed by the interface board 124 of FIG. 1. In an alternate embodiment, when the I and Q data are directly recorded to a long-term storage device, the conversion block 408 is unnecessary. In block 412, the I and Q data is input into the GPS processing circuit. In block 416, the GPS processing circuit processes the I and Q data to generate the position of the GPs antenna at the time the data was received. The process continues until a set of collected data is generated for the GPS processing circuit being tested in block 420. In decision block 424, it is determined whether a second GPS processing circuit is to be tested.

When a second or subsequent GPS processing circuit is to be tested, the long-term storage device containing the GPS byte data is decoupled from the GPS processing circuit previously tested in block 428. In block 432, the long-term storage device is connected to the next GPS processing circuit to be tested. Block 408 to 420 are repeated to test the next GPS processing circuit. The next GPS processing circuit generates a second or subsequent list of position points for the GPS processing circuit under test.

In an alternative embodiment or application of the invention, decision block 424 can be avoided by coupling all GPS processing circuits to be tested to the long-term storage device containing GPS data. One method of coupling multiple GPS processing devices to a long-term storage device is to daisy chain the GPS processing devices. When multiple GPS processing devices are simultaneously tested, only one iteration of blocks 208 to 420 is needed.

When, in decision block 424, it is determined that the last GPS processing circuit has been tested, a comparison may be done in block 436. In block 436, the comparison allows a determination of how each GPS processing circuit processed the same set of data, the data including multipath interference, dropouts and other artifacts. Typically, the location output by each GPS processing circuit is compared with the position of the GPS antenna when the processed data was received. The position of the GPS antenna at the time the data was received is the correct position. More accurate GPS processing circuits will generate a location closer to the correct position. The direct comparison of GPS data output by each GPS processing circuit with the correct position allows a determination of the relative processing speed and accuracy of competing GPS processing circuits on field data. Using this data, the GPS processing circuits may be modified to further enhance performance.

A number of examples have been illustrated in the preceding discussions. However, the specific examples presented were presented for illustrative purposes and should not be interpreted to limit the invention. The limits to the invention should be interpreted in terms of the claims as follows:

What is claimed:

1. An apparatus for collecting GPS data comprising:
   a down converter configured to receive a radio frequency (RF) GPS signal and to produce an intermediate frequency (IF) signal therefrom;
   an analog to digital converter coupled to the down converter and configured to convert the intermediate frequency signal to GPS data in a digital format;
   an interface board coupled to the analog to digital converter and the long-term storage device and configured to produce GPS data bytes from the GPS data in digital format; and
   a storage interface to couple a storage device to the interface board, the storage device configured to store the GPS data bytes.

2. The apparatus of claim 1 wherein each GPS data byte containing eight bits of the GPS data in digital format.

3. The apparatus of claim 1 wherein the interface board includes a temporary storage device to store the GPS data bytes before being output to the long-term storage device.

4. The apparatus of claim 3 wherein the temporary storage device is a first-in first-out (FIFO) memory.

5. The apparatus of claim 4 wherein the interface board includes an indicator configured to indicate an overflow or an underflow of the FIFO memory device.

6. The apparatus of claim 1 wherein the storage interface further includes a long-term storage device.

7. The apparatus of claim 6 wherein the long-term storage device is a nonvolatile memory.

8. The apparatus of claim 6 wherein the long-term storage device is a hard disk drive.

9. The apparatus of claim 6 wherein the long-term storage device is capable of a data transfer rate exceeding 0.70 megabytes per second.

10. The apparatus of claim 1 wherein the GPS data includes artifacts resulting from multipath interference.

11. The apparatus of claim 1 wherein the GPS data includes artifacts resulting from dropouts.

12. A method of generating test data in an area comprising:
   moving a GPS antenna about the area while receiving radio frequency GPS signals;
   digitizing the GPS signals to produce digital GPS data;
   storing the digital GPS data on a long-term storage device for use as test data; and
   disconnecting the GPS antenna from the long-term storage device.

13. The method of claim 12 further comprising connecting the long-term storage device to a GPS processing circuit.

14. The method of claim 12 further comprising reducing the radio frequency GPS signal to an intermediate frequency before the digitizing of the GPS signals.

15. The method of claim 13 further comprising processing the GPS data in the GPS processing circuit to determine locations of the GPS antenna at the time the GPS signals were received.

16. A method of testing a circuit for processing GPS data comprising:
   providing previously stored GPS data to a GPS processing circuit; and
   processing the previously stored GPS data in the GPS processing circuit to compute location at which the previously stored GPS data was collected.

17. The method of claim 16 wherein said providing previously stored GPS data further comprises coupling a long-term storage device storing GPS data to the GPS processing circuit.

18. The method of claim 17 further comprising indicating when a buffer FIFO transferring stored GPS data from the long-term storage device to the GPS processing circuit underflows or overflows.

19. The method of claim further comprising:
   disconnecting the long-term storage device including stored GPS data from the first GPS processing circuit;
   coupling the long-term storage device including stored GPS data to a second GPS processing circuit; and
   testing the second GPS processing circuit using the stored GPS data.

20. The method of claim 19 further comprising:
   comparing the position information output by the first GPS processing circuit to a correct position; and
   comparing the position information output by the second GPS processing circuit to the correct position to determine which GPS processing circuit has better accuracy.

21. The method of claim 17 wherein the long-term storage device is a hard disk drive.

22. The method of claim 19 wherein the GPS data processed by the first GPS processing circuit and the GPS data used in the testing of the second GPS processing circuit is the same.

23. The method of claim 16 wherein the GPS processing circuit computes the velocity of the antenna and the time at which the previously stored GPS data was received.

24. A method of testing a GPS circuit comprising:
   producing position and velocity output using a GPS processor while recording the GPS data to generate recorded data; and
   processing the recorded data using said GPS processor to recreate the position and velocity output.

25. An apparatus for collecting GPS data comprising:
   a down converter configured to receive a radio frequency (RF) GPS signal and to produce an intermediate frequency (IF) signal therefrom;
   an analog to digital converter coupled to the down converter and configured to convert the intermediate frequency signal to GPS data in a digital format;
   a storage interface coupled to the analog to digital converter; and
   a long-term storage device coupled to the storage interface, the long-term storage device configured to store the GPS data in digital format.

26. The apparatus of claim 25 wherein the long-term storage device is a nonvolatile memory.

27. The apparatus of claim 25 wherein the long-term storage device is a hard disk drive.

28. The apparatus of claim 25 wherein the long-term storage device is capable of a data transfer rate exceeding 0.70 megabytes per second.

* * * * *